United States Patent
Marshall et al.

(10) Patent No.: US 7,295,321 B1
(45) Date of Patent: Nov. 13, 2007

(54) VISAR INTERFEROMETER WITH FIELD ELEMENTS

(75) Inventors: Bruce Russell Marshall, Santa Barbara, CA (US); Marcus David Knudson, Albuquerque, NM (US); Elliot Michael Burke, Goleta, CA (US); Terrence John Davies, Santa Barbara, CA (US); Gerald Daniel Stevens, Ventura, CA (US)

(73) Assignee: National Security Technologies, LLC, Las Vegas, NV (US)

( * ) Notice: Subject to any disclaimer, the term of this patent is extended or adjusted under 35 U.S.C. 154(b) by 156 days.

(21) Appl. No.: 11/290,717

(22) Filed: Nov. 30, 2005

Related U.S. Application Data

(60) Provisional application No. 60/632,166, filed on Nov. 30, 2004.

(51) Int. Cl.
*G01B 9/02* (2006.01)
(52) U.S. Cl. .................. 356/450; 356/28.5; 356/478
(58) Field of Classification Search ............. 356/28.5, 356/450, 478, 491, 520
See application file for complete search history.

(56) References Cited

U.S. PATENT DOCUMENTS

| | | | |
|---|---|---|---|
| 5,245,473 A * | 9/1993 | Stanton et al. ............. 356/450 |
| 5,481,359 A | 1/1996 | Barker | |
| 5,493,398 A * | 2/1996 | Pfister ....................... 356/520 |
| 5,870,192 A | 2/1999 | Barker | |
| 6,115,121 A * | 9/2000 | Erskine ...................... 356/450 |
| 6,504,614 B1 * | 1/2003 | Messerschmidt et al. ... 356/455 |

OTHER PUBLICATIONS

Hemsing et al, VISAR: Lone-Imaging interferometer, SPIE, vol. 1346, 1990, pp. 133-140.*

Sweatt, Depth of focus in velocity interferometer system for any reflector systems, Review of Scientific Insruments, vol. 63, No. 5, May 1992, pp. 2945-2949.*

* cited by examiner

*Primary Examiner*—Samuel A. Turner
(74) *Attorney, Agent, or Firm*—Robert Ryan Morishita; Morishita Law Firm, LLC

(57) ABSTRACT

The present invention includes an interferometer for VISAR. Optionally, the present VISAR system includes intracavity imaging design with converging beams and field elements to, among other possible purposes, image the array. An optional embodiment of the present VISAR system may also optionally include precision fiber arrays. Optionally, the present system may use non-collimated beams to allow intracavity access to individual channels for one or more additional delay paths.

20 Claims, 2 Drawing Sheets

VISAR INTERFEROMETER WITH FIELD ELEMENTS

RELATED APPLICATION DATA

The present application claims the priority of U.S. Provisional Application Ser. No. 60/632,166, entitled "Multichannel Fiber-Coupled VISAR Interferometer with Field Elements," filed Nov. 30, 2004 by Applicant herein.

FIELD OF THE INVENTION

The present invention relates to laser velocity interferometry, specifically to a Velocity Interferometry System for Any Reflector ("VISAR") that includes field elements to improve the quality and efficiency of imaging within the interferometer.

BACKGROUND OF THE INVENTION

VISAR systems are commonly used to study large changes in velocity by measuring the Doppler shift of laser light reflected from a moving object. The term VISAR has come to describe a system that includes the laser, delivery optics, interferometer, collection optics, and recording system. In a VISAR system, laser light is delivered to a target. Reflected or scattered light is collected and delivered to an interferometer for analysis and then to a recording system. The distinguishing characteristic of a VISAR system is the use of a wide angle, unequal-path Michelson interferometer to analyze the spectrum of the Doppler-shifted light that is reflected from an extended area on the target and often relayed to the interferometer via multimode optical fiber.

In a conventional Michelson interferometer, collimated light incident on a beamsplitter is directed along two paths to mirrors that reflect the light back to the beamsplitter, where the beams are recombined and interfere. If the light is well collimated and approximates a plane wave, the wavefronts will overlap well and can produce a high degree of fringe contrast even with significant delay in the interferometer. If the incoming wavefront is not planar but instead diverges from a point source or consists of a complex ensemble of diverging wavefronts produced by collimating light from an extended source, the phase of the interference will vary across the output beam and the overall extinction will be poor unless the path lengths in the interferometer are exactly equal.

To use a Michelson interferometer as a spectrometer for Doppler shift measurements, it is necessary to introduce a delay into one of the paths such that the resulting fringe spacing is appropriate for the spectral shift being measured. To achieve good extinction, additional optics must be added to the basic Michelson interferometer so that the recombined wavefronts match well in spite of the unequal paths. This is the essence of the wide angle Michelson interferometer used in VISAR. The VISAR, by its very nature as a wide field Michelson interferometer, equalizes the beam divergence over two optical paths of different lengths, thereby allowing the delayed beam to interfere efficiently with the undelayed beam. This equalization can be accomplished either by inserting thick windows of high index material into the delay leg and placing the cavity mirror at the correct distance to satisfy the wavefront matching requirements, or by the use of relay lenses to image the mirrors within the cavity. The glass windows approach is the most common VISAR arrangement. However, traditional VISAR design does not address the problem of efficient fiber-to-fiber coupling or imaging through the interferometer, in which the image size as well as the numerical aperture must be preserved.

Light from an extended source, such as a fiber array, can be collimated by a lens, relayed through an interferometer, and re-imaged by another lens, as described in U.S. Pat. No. 5,870,192 and U.S. Pat. No. 5,481,359. Light from all the fibers in the input array is collimated into a single beam that is not resegregated until the beam is reimaged onto the output array. Such a VISAR can be considered as an image relay system with no field elements. For most practical systems, the relay lenses are separated by a distance considerably larger than their focal lengths, which results in an increase of the numerical aperture and/or size of the image. For a system using 1:1 imaging to couple identical fiber arrays through a typical interferometer, the increased numerical aperture represents a significant loss of efficiency. The numerical aperture can be reduced by magnification, but larger fibers, which may not be compatible with small detectors, must then be used in the output array.

The divergence problem described above can be avoided by putting the collimating lenses in an afocal arrangement so that they are separated by the sum of their focal lengths. However, this results in an excessively long and large diameter optical path and is not generally practical.

The solution described in the present invention is to treat the problem as a system of relay lenses and use a field element to correct the divergence of the beam. In this approach, the fiber arrays are imaged at the cavity mirrors within the interferometer and the cavity mirrors are modified to also function as field elements to relay the pupil image. The resulting image of the input array at the output plane is precisely matched in size and numerical aperture to the output array, resulting in efficient coupling. Some other benefits of this approach are that it allows a larger field of view through the same diameter optics and reduces crosstalk by reducing aberrations. The larger field of view also allows larger fiber separation which enables improvements in array construction while further reducing crosstalk.

There are several benefits to the VISAR system that result from these interferometer improvements. Improved time resolution is a consequence of the improved imaging performance. Most existing VISAR systems use photomultipliers that have large detection areas and are very sensitive but are limited to approximately 1 nanosecond response time. Faster detectors are available in the form of photodiodes and streak cameras, but both of these require small sensing elements to achieve high speed. The improvements in VISAR interferometer optics provide efficient coupling even with small optical fibers that are compatible with fast detectors.

The high optical efficiency of the improved VISAR interferometer reduces the size and cost of the laser sources that are required. Laser power is often a limiting factor in designing an experiment using VISAR, particularly when high speed detectors are used. By raising the optical efficiency of the interferometer, the laser power required is considerably reduced.

The field elements in the improved VISAR eliminate vignetting and, in combination with the CCTV lenses, allow a much larger source than is usually possible. This allows more channels to be relayed through a given size of optics. It also allows more space between the fibers, which in turn allows more precise fiber array design. This, in turn, provides improved coupling and reduced crosstalk.

Since the fibers are imaged at the cavity mirrors, alignment of the optical system is simplified. The images of the fibers from all of the arrays are readily viewed at the cavity mirrors. Rotation, focus, magnification, and position can easily be adjusted to overlap the fiber images.

It is possible to split the delay leg so that a subset of the channels has a delay that is different from the other channels. Since the beams generated by the individual fibers in the array are imaged at the cavity mirror, they are spatially separate over several inches of the optical path near the mirror. A mirror can be placed to intercept one or more rows of beams and direct them to an alternate cavity mirror that provides a different delay. In this way, the improved VISAR can perform the function of two separate VISARs of the conventional design.

In summary, the use of intracavity imaging and field elements makes possible a number for significant improvements in VISAR system performance.

SUMMARY OF THE INVENTION

The present invention consists of an interferometer, optionally a fiber-array-coupled wide-field Michelson interferometer, for use in VISAR. More specifically, an image of the input source is formed at the cavity mirrors and a field element is placed within the cavity to compensate for divergence. As a result, the interferometer output image matches the input both in size and numerical aperture, resulting in efficient fiber to fiber coupling over a large area.

Thus, one optional embodiment of the present invention differs from previous designs in that the light from the fibers is not collimated in the interferometer, but instead is imaged to discrete locations at the cavity mirrors, which are concave and serve as field elements. This approach makes possible the use of more precise fiber arrays with increased space between the fibers for greater isolation. It also allows diversion of a subset of the beams inside the cavity to a different delay path, thereby providing simultaneous, differing delays with only a small amount of additional hardware and optics.

As a consequence, optical efficiency is increased. Smaller optical components can be used in the interferometer, reducing bulk as well as cost. Output fibers can be of the same size and numerical aperture as the input fibers, which allows the use of graded index fibers and smaller photodetectors to achieve higher recording bandwidth. Increased field size allows wider spacing of the fibers, thereby allowing the use of metal support structure to build the fiber arrays that give better isolation between fibers as well as more accurate placement of fibers for improved coupling efficiency.

DESCRIPTION

Figure 1:
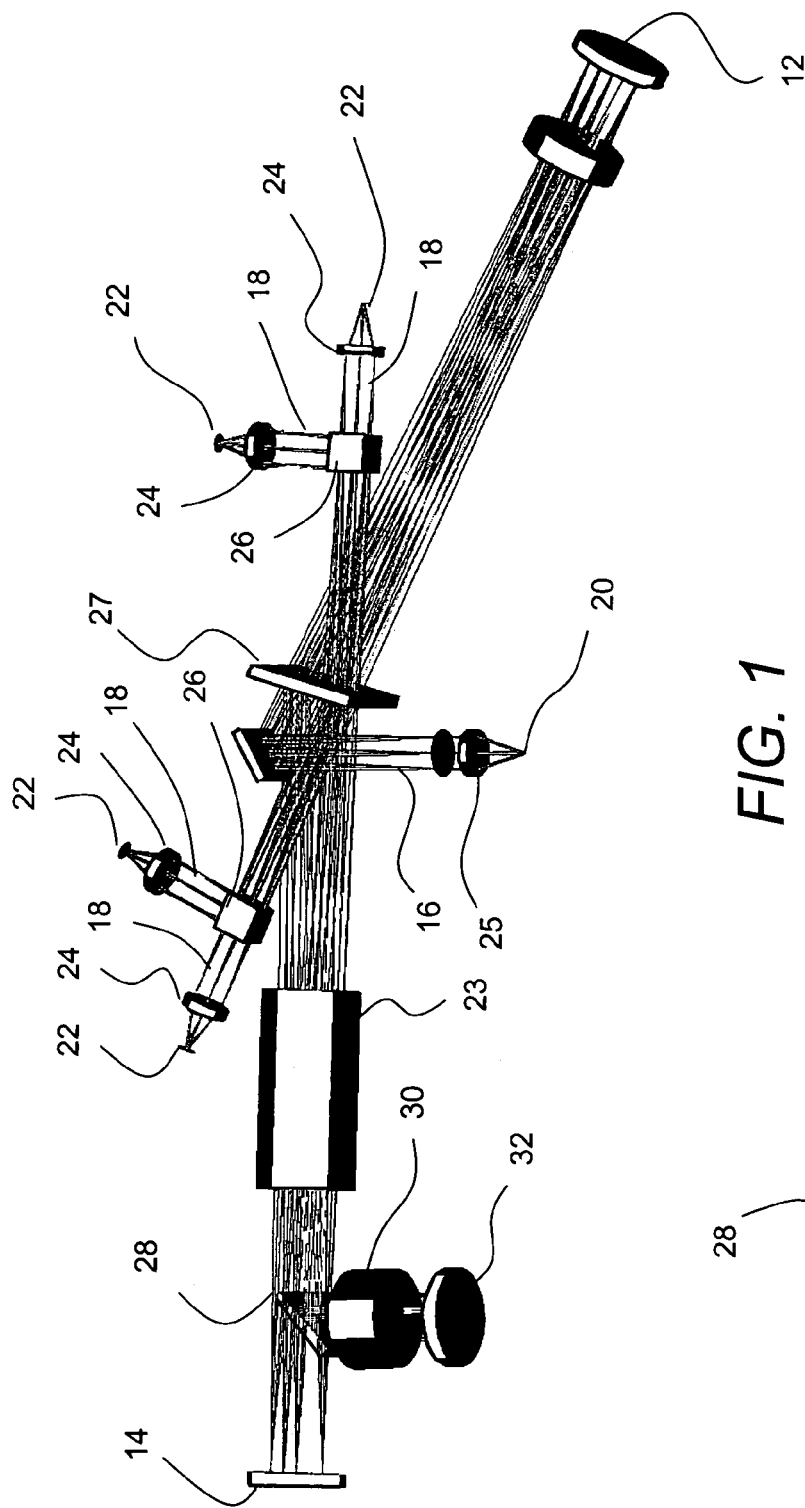
FIG. 1 is an elevated perspective view of a VISAR according to an embodiment of the present invention.
Figure 2:
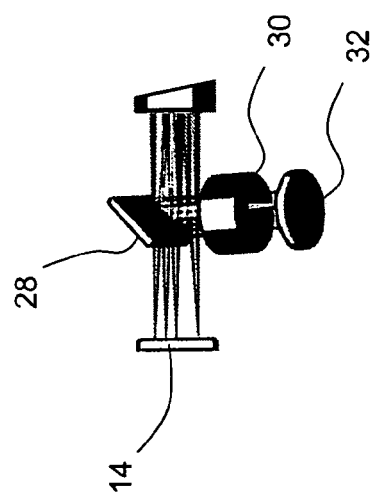
FIG. 2 is a bottom view of a pickoff mirror with two rows of fibers illuminated according to an embodiment of the present invention.
Figure 3:
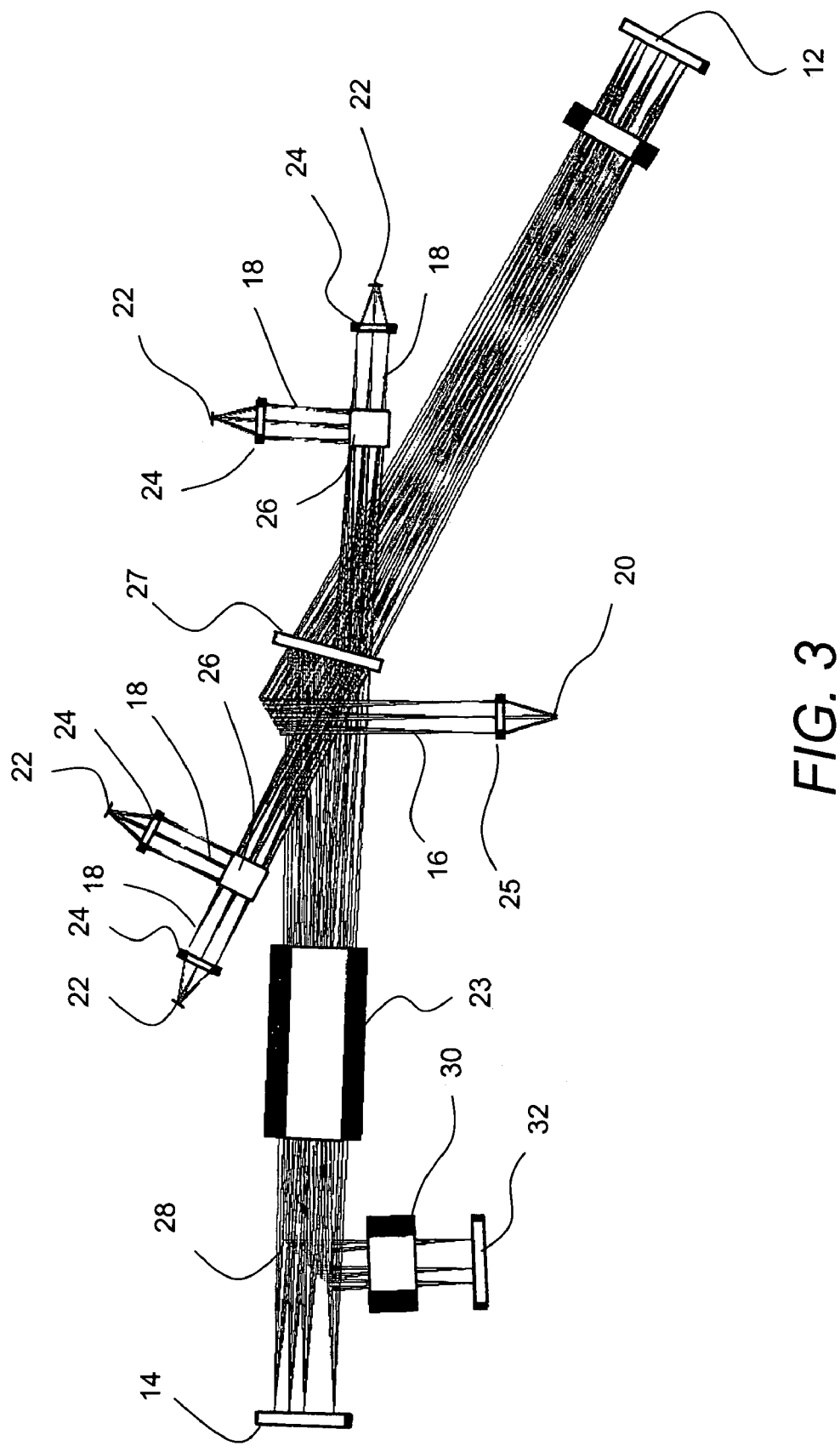
FIG. 3 is a top view of a VISAR according to an embodiment of the present invention.

Reference is now made to the figures wherein like parts are referred to by like numerals throughout. Turning to FIGS. 1-3, one optional embodiment of the present invention is a multichannel VISAR consisting of a wide-field Michelson interferometer with matched input fiber arrays 20 and output fiber arrays 22, lenses 24, 25 for imaging the arrays 20, 22, concave cavity mirrors 12, 14 that also serve as field elements, a light splitter 27 to create at least two cavity paths, and polarization optics 26 to polarization-multiplex and demultiplex the quadrature signals, along with appropriate hardware to position and hold the optical components. The cavity mirrors 12, 14 are tilted to spatially separate the output beams 18 from the input beams 16. The cavity paths have different delays associated therewith. This can be accomplished in many different ways including using paths of different lengths, or disposing a primary etalon 23 in one of the paths. Although the optional embodiment shown in the figures is directed to a fiber-coupled multi-channel VISAR, it is specifically noted that the present invention could be applied to any VISAR, including a single channel VISAR and/or a non-fiber coupled VISAR.

It is noted that this is but one embodiment of the present invention and that the same approach could be used with lens relayed VISARs. Similarly, additional delays could be incorporated.

As is well known in the art, VISAR is widely used in shock velocity measurements, including a number of U.S. government laboratories as well as many academic and commercial locations. Regardless of the specific implementation, the present invention can provide better quality, lower cost velocity measurements using with higher channel density than the prior art designs. Additionally, in an optional embodiment in which an additional cavity leg is defined, a VISAR according to such an optional embodiment could replace two VISARs of the prior art designs. Improved optical efficiency could also reduce the optical power required for a measurement, saving on laser cost or allowing more measurement points with a given laser.

Returning to the optional embodiment of FIGS. 1-3, each of the fiber arrays 20, 22 may be constructed by mounting the optical fibers in a pattern of holes drilled in a metal mask and then optically polishing the assembly. In this optional embodiment, crosstalk can be reduced since adjacent fibers are not in direct contact and are separated by the opaque mask material. The precision hole drilling, typically using wire EDM, allows fiber placement to within the blur circle of the optical imaging system.

In this optional embodiment, each fiber array 20, 22 has an associated lens 24, 25 that forms an image of the array at the cavity mirrors 12, 14. These lenses are not used to collimate the light, but rather to image the array. In an optional embodiment, standard CCTV lenses may be used because of their optical performance, availability, and cost. The imaging arrangement results in an array of discrete, converging beams over much of the optical path inside the cavity near the mirrors 12, 14.

While many different configurations could be used, in this optional embodiment, the concave mirrors 12, 14 that define the interferometer cavity have focal length one-half the optical path length from the input array lens 25 to the mirror 12, 14. Therefore, the exit pupil of the input array lens 25 is imaged onto the entrance pupils of the output array lenses 24. The imaging optics function as a relay system with a field element at the intermediate image plane. This design can reduce or eliminate the divergence inherent in a collimated beam system and greatly improve the coupling efficiency. It also simplifies system alignment because multiple arrays can be illuminated and their images made coincident at the field mirrors where they are easily viewed.

In a further optional embodiment, an additional cavity leg may be defined. In the optional embodiment of FIGS. 1-3, since the beams corresponding to individual fibers are spatially separate over a portion of the delay path, a mirror 28 may be placed to intercept some of the beams and divert them through an additional etalon 30 to another field mirror 32 which defines an alternate cavity leg. Therefore, this subset of fibers sees a different delay than the remaining fibers. For example, it is practical in a nineteen fiber VISAR with a hexagonal array pattern to have twelve channels with one delay and seven channels with another delay. However, if the array layout has appropriate symmetry, the division could optionally be equal. Since VISARs are commonly operated in pairs to resolve ambiguity due to missed fringes, it is contemplated that the dual delay capability of such an optional embodiment may eliminate the need for a second VISAR.

While certain embodiments of the present invention have been shown and described it is to be understood that the present invention is subject to many modifications and changes without departing from the spirit and scope of the claims presented herein.

We claim:

1. An interferometer for a velocity interferometry system for any reflector comprising:
    an input fiber array generating one or more input beams;
    at least two output fiber arrays;
    a light splitter directing input beams from said input fiber array into at least two different optical paths, each optical path defined by said input fiber array and one of said output fiber arrays;
    a concave cavity mirror in each optical path disposed between said input fiber array and said output fiber array;
    an input array lens imaging said input fiber array at each cavity mirror; and
    an output array lens imaging each output fiber array at the cavity mirror in the optical path defined by said output fiber array.

2. The device of claim 1 further comprising a primary etalon disposed along one of said optical paths.

3. The device of claim 1 wherein said input array lens is imaging.

4. The device of claim 1 wherein said output array lens is imaging.

5. The device of claim 1 wherein said input fiber array comprises a plurality of spaced optical fibers forming a pattern.

6. The device of claim 5 wherein said output fiber array comprises a plurality of spaced optical fibers matching said pattern of said input fiber array.

7. The device of claim 5 wherein said input fiber array and said output fiber arrays each comprise:
    a metal mask with a pattern of spaced holes; and
    optical fibers mounted in each hole of said pattern of holes.

8. The device of claim 1 wherein said cavity mirrors are oriented such that the input beams from said input array are spatially separate from the output beams to said output arrays.

9. The device of claim 1 wherein each cavity mirror has a focal length equal to one-half the optical path length from said input array lens to said cavity mirror.

10. The device of claim 1 further comprising:
    at least one mirror positioned along one of said optical paths to redirect at least a portion of the input beams along an alternate optical path;
    a secondary etalon disposed along said alternate optical path; and
    a cavity mirror disposed along said alternate optical path receiving said redirected input beams after passing through said secondary etalon.

11. An interferometer for a velocity interferometry system for any reflector comprising:
    an input fiber array having a plurality of spaced optical fibers forming a pattern to generate a plurality of input beams;
    at least two output fiber arrays having a plurality of spaced optical fibers matching said pattern of said input fiber array;
    a light splitter directing the input beams from said input fiber array into at least two different optical paths, each optical path defined by said input fiber array and one of said output fiber arrays;
    a concave cavity mirror in each optical path disposed between said input fiber array and said output fiber array;
    an input array lens imaging said input fiber array at each cavity mirror; and
    an output array lens imaging each output fiber array at the cavity mirror in the optical path defined by said output fiber array.

12. The device of claim 11 further comprising a primary etalon disposed along one of said optical paths.

13. The device of claim 11 wherein said input fiber array and said output fiber arrays each comprise:
    an optically polished metal mask with a pattern of spaced holes; and
    optical fibers mounted in each hole of said pattern of holes.

14. The device of claim 11 wherein said cavity mirrors are oriented such that the input beams from said input array are spatially separate from the output beams to said output arrays.

15. The device of claim 11 wherein each cavity mirror has a focal length equal to one-half the optical path length from said input array lens to said cavity mirror.

16. The device of claim 11 further comprising:
    at least one mirror positioned along one of said optical paths to redirect at least a portion of the input beams along an alternate optical path;
    a secondary etalon disposed along said alternate optical path; and
    a cavity mirror disposed along said alternate optical path receiving said redirected input beams after passing through said secondary etalon.

17. An interferometer for a velocity interferometry system for any reflector comprising:
    an input fiber array having a plurality of spaced optical fibers forming a pattern to generate a plurality of input beams;
    at least two output fiber arrays having a plurality of spaced optical fibers matching said pattern of said input fiber array;
    a light splitter directing the input beams from said input fiber array into at least two different optical paths, each optical path defined by said input fiber array and one of said output fiber arrays;
    a primary etalon disposed along only one of said optical paths;
    a concave cavity mirror in each optical path disposed between said input fiber array and said output fiber array, wherein said cavity mirrors each have a focal length equal to one-half the optical path length from said input array lens to said cavity mirror and said cavity mirrors are oriented such that the input beams from said input array are spatially separate from the output beams to said output arrays;

an input array lens imaging said input fiber array at each cavity mirror; and an output array lens imaging each output fiber array at the cavity mirror in the optical path defined by said output fiber array.

18. The device of claim 17 wherein said input fiber array and said output fiber arrays each comprise:

an optically polished metal mask with a pattern of spaced holes; and optical fibers mounted in each hole of said pattern of holes.

19. The device of claim 17 further comprising:

at least one mirror positioned along one of said optical paths to redirect at least a portion of the input beams along an alternate optical path;

a secondary etalon disposed along said alternate optical path; and a cavity mirror disposed along said alternate optical path receiving said redirected input beams after passing through said secondary etalon.

20. The device of claim 17 further comprising a polarizing beam splitter positioned along one or more of said optical paths between said cavity mirror and said output array lens defining said optical path.

* * * * *